Dec. 20, 1960      E. P. ANDERSON      2,964,943
RAIN GAUGE
Filed March 5, 1957

INVENTOR.
EDWARD P. ANDERSON

ATTORNEYS

United States Patent Office 2,964,943
Patented Dec. 20, 1960

2,964,943
RAIN GAUGE

Edward P. Anderson, Livingston, N.J., assignor, by mesne assignments, to Engelhard Industries, Inc., Newark, N.J., a corporation of Delaware Filed Mar. 5, 1957, Ser. No. 644,121

7 Claims. (Cl. 73—171)

This invention relates to a novel rain gauge for use in the accurate measurement of rainfall.

The apparatus of this invention possesses many advantages over prior devices used for the measurement of rainfall in that it is small in size, light in weight, and is electrically powered. The device has an accuracy to within 0.01 inch in rainfall measurement even under very diverse conditions, such as supply voltage changes ±15 percent, frequency changes of ±5 cycles and temperature changes between 32° F. and 140° F. This device is customarily constructed to measure a range of about 10 inches of rainfall, but it may easily be designed for a greater or less amount if desired. The equipment is easily secured in position by three threaded mounting supports, and it may be leveled by the use of two spirit levels mounted at 90° to each other.

The device is provided with an overall waterproof housing which covers all but the rain collection funnel itself, the funnel being constructed in such a manner as to minimize rain washout.

The device may be constructed from materials all of which are corrosion proof and no damage is sustained by the equipment in the event of freezing. Generally speaking, the device consists of a base and a waterproof housing having a rain collection funnel mounted on the top thereof. The operating part of the device consists of two chambers, both of which are connected to the stem of a funnel by appropriate orifices and thus the liquid level in the stem of the funnel and both of the chambers is the same.

The first chamber contains a variable float type contact which consists of a metal float so mounted that it floats at all times in the center of the first chamber. An adjustable contact is threaded into the first chamber through the top thereof so that it is possible to set the contact point to touch the surface of the float at a predetermined liquid level.

In the second chamber a liquid displacement cylinder is provided having a threaded shaft projecting therethrough and having gear means on the top of the shaft so that rotation thereof causes the cylinder to be raised or lowered within the chamber. Means is also provided for automatically emptying and resetting the gauge.

Figure 1:
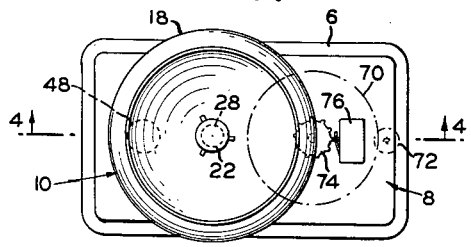
Figure 2:
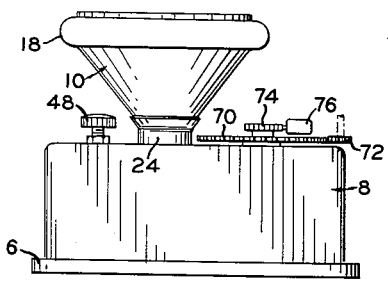
Figure 3:
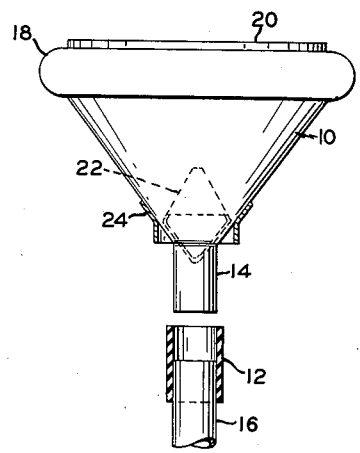
Figure 4:
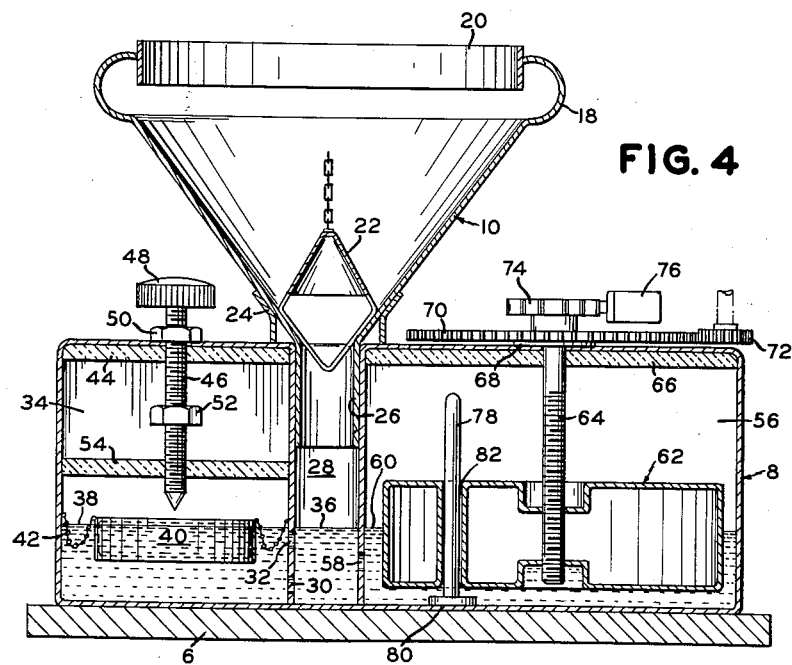

The invention will be further illustrated by reference to the accompanying drawings in which Figure 1 is a plan view of one embodiment of the invention, Figure 2 is a view in elevation of one embodiment of the invention, Figure 3 is an exploded view in detail of one embodiment of the funnel construction, and Figure 4 is a sectional view taken on line 4—4 of Figure 1, and showing the device with the housing removed.

Referring to Figures 1 and 2 of the drawing, the device consists of a base 6 having the waterproof housing 8 secured thereto. A rubber hose connection 12 is provided to seal the lower end 14 of the funnel 10 into the body of the device, the connection 12 thereby forming a seal between the bottom of the funnel 14 and the stem 16 thereof.

As best seen in Figures 3 and 4, the funnel housing lip 18 is formed in the shape of a C, and the opening of the funnel has a vertical flange 20 thereon, such that the flange or rim protrudes above and below the top of the funnel housing itself. The construction provides a trap which eliminates rain washout. A removable cone 22, supported at three points, is located in the throat or neck of the funnel to minimize air turbulence within the interior of the equipment, and the funnel is sealed to the body of the rain gauge by means of the seal 24, which prevents the entry of rain water into the device from any place except through the funnel 10.

Referring to Figure 4 of the drawing, the neck 26 of the funnel protrudes into a circular bore 28 which communicates by means of the orifices 30 and 32 with a first chamber or reservoir 34. The liquid level, indicated as 36 in the bore 28, is the same as the liquid level 38 in the reservoir or chamber 34.

A metallic float 40 which may be of any desired shape, but which is preferably cylindrical, is mounted in the chamber 34 and is maintained centrally located therein by means of the chains 42 which are preferably three in number, and which are secured to the float at 120° apart around the periphery thereof.

Threaded through the top 44 of the chamber 34 is an adjustable contact 46, this contact being threaded through a suitable insulating material between the contact itself and the top 44 of the chamber 34. The top of the contact 46 is provided with a knurled portion 48 for the purpose of adjustment and a lock or jam nut 50 is provided to maintain the contact in a fixed position. The contact 46 may also be provided with the limit nut 52 which is adapted to abut against the support 54, through which the contact is threaded in order to prevent damage to the float 40 by turning the contact 46 down an excessive amount.

A second chamber 56 communicates with the bore 28 by means of the orifice 58 and thus the chamber 56 will have a water level 60 which is identical with that of the bore 28 and the chamber 34.

Mounted within the chamber 56 is a metal cylinder 62 having a tapped bore therein for the reception of the threaded stud or shaft 64 which is supported on the top 66 of the chamber 56 by means of the bearing 68. A spur gear 70 is keyed to the shaft 64 and meshes with a second spur gear 72, the second spur gear 72 being mounted on the drive shaft of an electric motor, not shown. Mounted on the top of the shaft 64 is a cam 74 which is adapted to actuate the microswitch 76. The microswitch is so arranged that a number of contacts are made to cover a desired range of rain fall and these contacts in turn serve to operate Veeder Root counters, not shown, which can be mounted locally or remotely, to record rainfall readings. Rotation of the cylinder 62 is prevented by the rod 78 which is secured to the bottom 80 of the chamber 56 and which projects through a bore 82 in the cylinder 62.

If desired, this equipment may be constructed so that it will withstand sub-freezing temperatures without damage, and in one embodiment of this type, the chambers 34 and 56 are lined with cork, with the result that the resiliency of the cork, coupled with the strength of the metal chambers for example stainless steel, will withstand the pressure exerted by the expansion of the water in the device as it freezes. Such freezing of the equipment should be avoided if possible however, since recalibration of the device is necessary after such an exposure. No permanent damage results to the equipment however, since the resiliency in the contact pointer reset structure eliminates any danger of the float being crushed against its contact.

In the operation of the device of the invention, as rain water raises the liquid level in the chambers 34 and 56 and in the bore 28, contact will be made between the float 40 and the contact point 46 in the chamber 34, and when contact is made, an electric motor, not shown, is actuated and by means of the spur gears 72 and 70 rotates the threaded shaft 64 so that the cylinder 62 is raised in the chamber 56 until the water level 60 in the chamber or reservoir 56 has dropped sufficiently that electrical contact between the float 40 and the contact point 46 is broken, thereby stopping the motor. As the spur gear 70 and threaded shaft 64 are driven by the motor, the 10 point cam 74, mounted on the gear system connecting the motor to the shaft, actuates the microswitch 76 to make 10 contacts per revolution. This microswitch is so arranged that 2,000 contacts are made through the microswitch to cover a 10 inch rainfall, these contacts in turn serving to operate Veeder Root counters which reflect rainfall readings.

The equipment may also be provided with facilities for automatically emptying and resetting, and in one embodiment, a remote switch is provided to reverse the drive motor so that the cylinder 62 may be lowered to its original or starting position, with the result that the water within the device is ejected through a vent, not shown, but which is located in the proper position to perform this function. The vent may be an aperture drilled through the side of one or both of the chambers 34 and 56 so that the lowering of the cylinder 62 causes the water in the device to overflow through the vent. After the water is ejected, the microswitch is returned to its operating position where the equipment adjusts itself on starting position and the Veeder Root counters are then reset.

In one specific embodiment of the invention, the equipment measured 16 inches in length, 10 inches in width and was 11½ inches high, without the funnel. The funnel presents a receiving area of 50 square inches and protrudes 6½ inches above the top of the equipment housing. The device weighed 45 pounds and operated from 110 volt, 60 cycle current. The device measured a range of 10 inches of rainfall to an accuracy of 0.01 inch, at changes of temperature between 32° F. and 140° F. The device was cork lined and the chambers therein were fabricated from stainless steel, and no damage resulted to the device when subjected to freezing temperatures.

It will be obvious to those skilled in the art that many modifications may be made within the scope of the present invention without departing from the spirit thereof, and the invention includes all such modifications.

What is claimed is:

1. In a rain gauge, a water container, means for collecting rain water and directing it into said water container, means for providing an electrical signal when the water level reaches a predetermined height, displacement means in said container for maintaining said water level near said predetermined height as rain water is collected, and means for indicating movement of said displacement means.

2. A rain gauge comprising first and second interconnected chambers, means for collecting rain water and directing it into said first and second chambers, electrical contact means for indicating the water level in said first chamber, and displacement means in said second chamber for varying the water level in said first chamber.

3. A rain gauge comprising a water container, means for collecting rain water and directing it into said container, electrical contact means for indicating the water level in said container, and displacement means in said container for varying the water level in said container.

4. A rain gauge comprising a water container, means for collecting rain water and directing it into said container, electrical contact means including a float for indicating the water level in said container, displacement means in said container for varying the water level in said container, means for varying the position of said displacement means, means for providing electrical signals indicating movement of said displacement means, and means for guiding the movement of said displacement means and said float.

5. A rain gauge comprising a water container, means for collecting rain water and directing it into said container, electrical contact means for indicating the water level in said container, displacement means in said container for varying the water level in said container, and means for varying the position of said displacement means.

6. A rain gauge comprising first and second chambers, means for collecting rain water and directing it into said first chamber, electrical contact means for indicating a reference water level in said first chamber, means for interconnecting said two chambers below the reference water level, and displacement means in said second chamber for varying the water level in said first chamber.

7. A rain gauge comprising a water container, means for collecting rain water and directing it into said container, electrical contact means including a float for indicating the water level in said container, displacement means in said container for varying the water level in said container, means for varying the position of said displacement means, and means for guiding the movement of said displacement means and said float.

References Cited in the file of this patent

UNITED STATES PATENTS 2,497,759    Cappleman  ------------  Feb. 14, 1950